Apr. 24, 1923.
D. T. PHILLIPS
1,452,929
CORN HARVESTER AND SHOCKER
Filed March 15, 1919
6 Sheets-Sheet 3
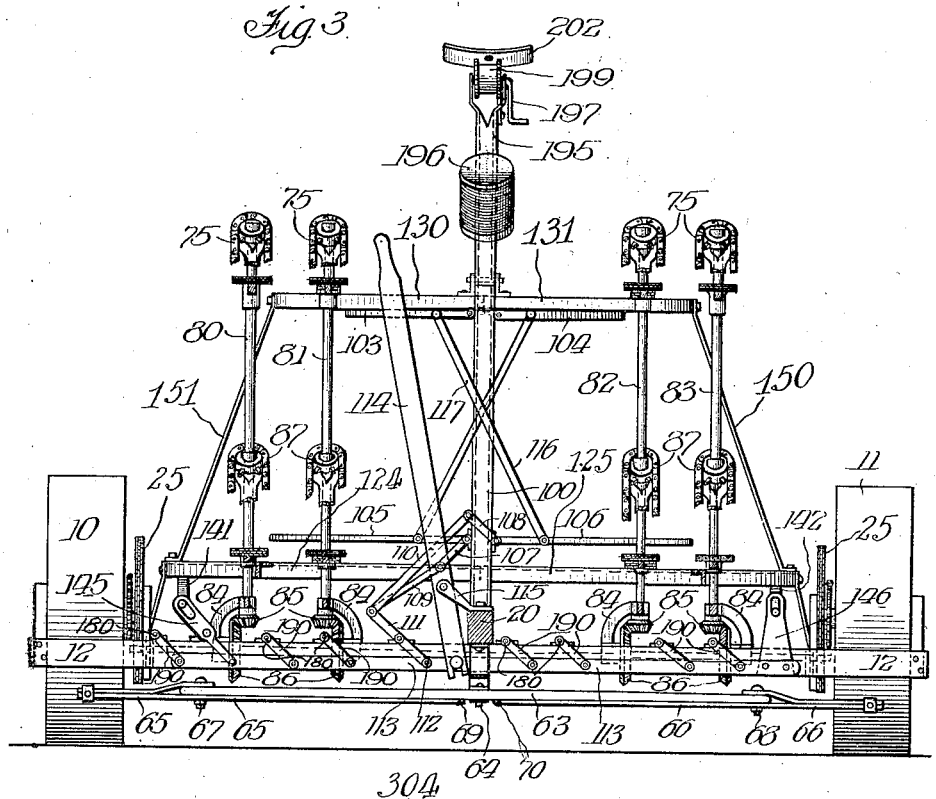
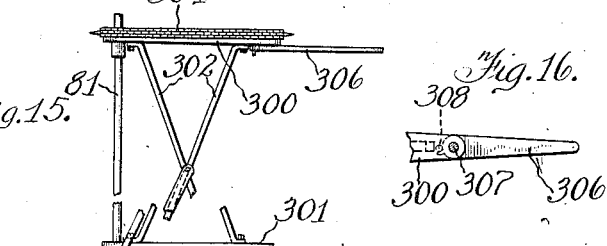

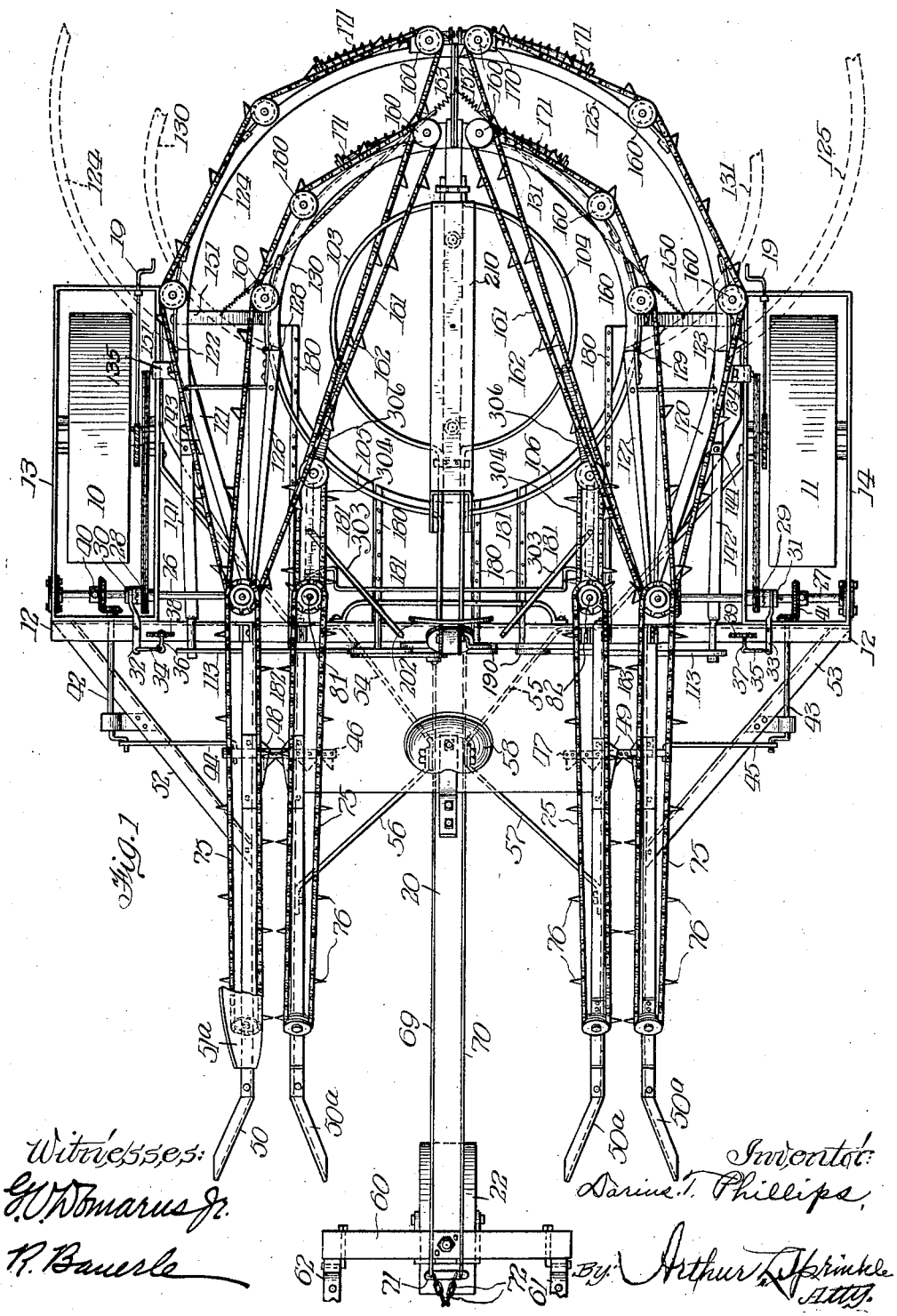

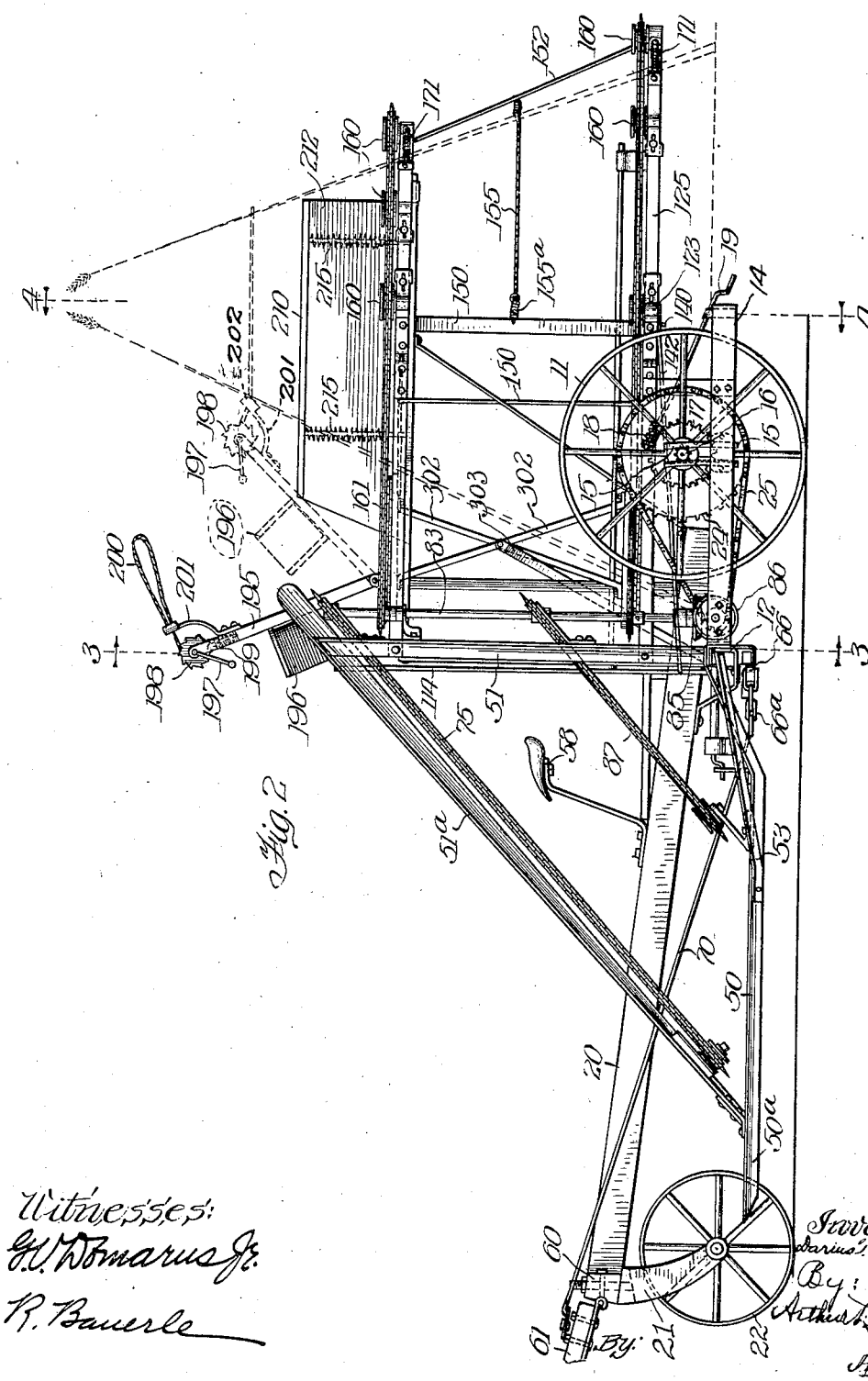

Apr. 24, 1923.
D. T. PHILLIPS
1,452,929
CORN HARVESTER AND SHOCKER
Filed March 15, 1919 6 Sheets-Sheet 4
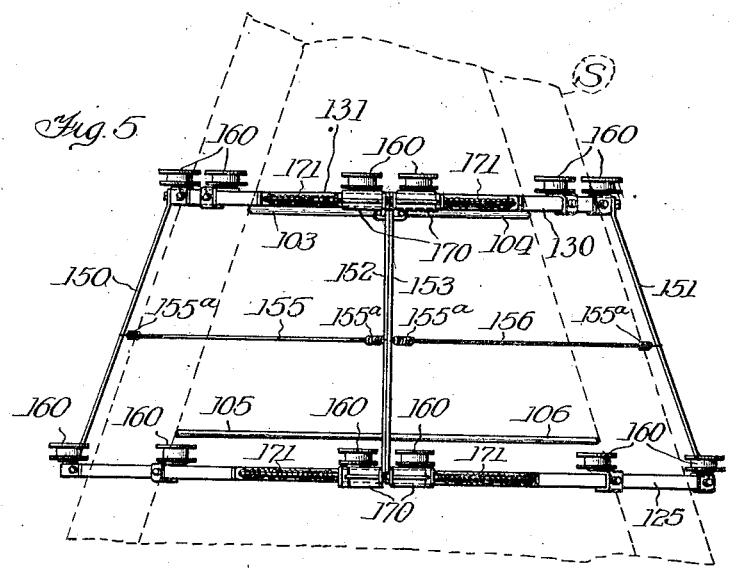
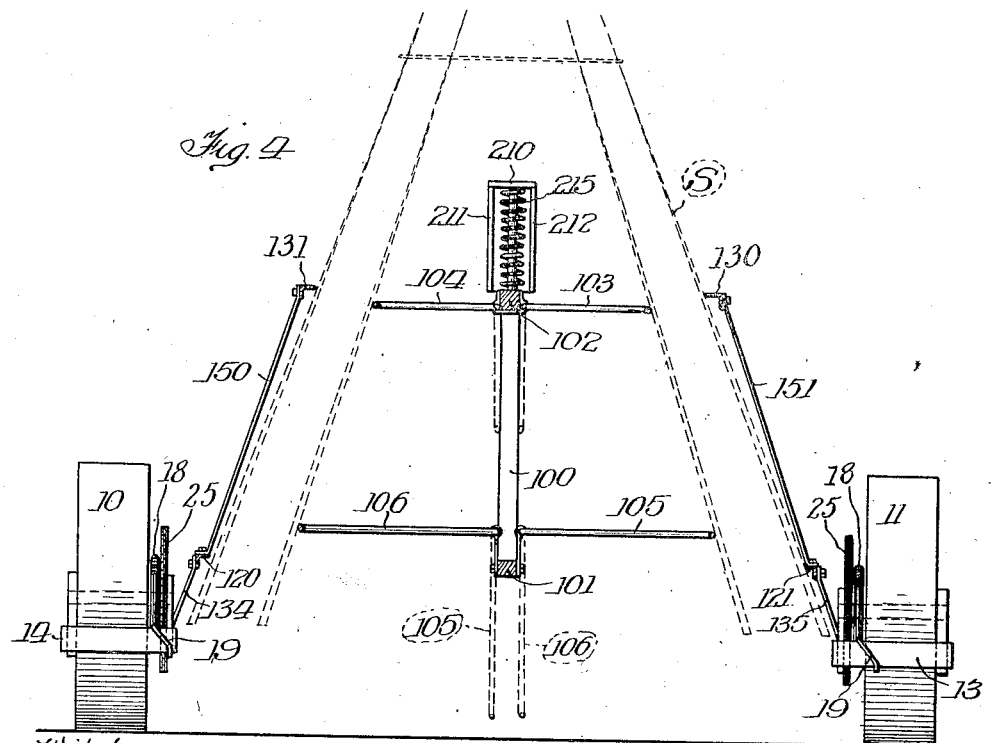

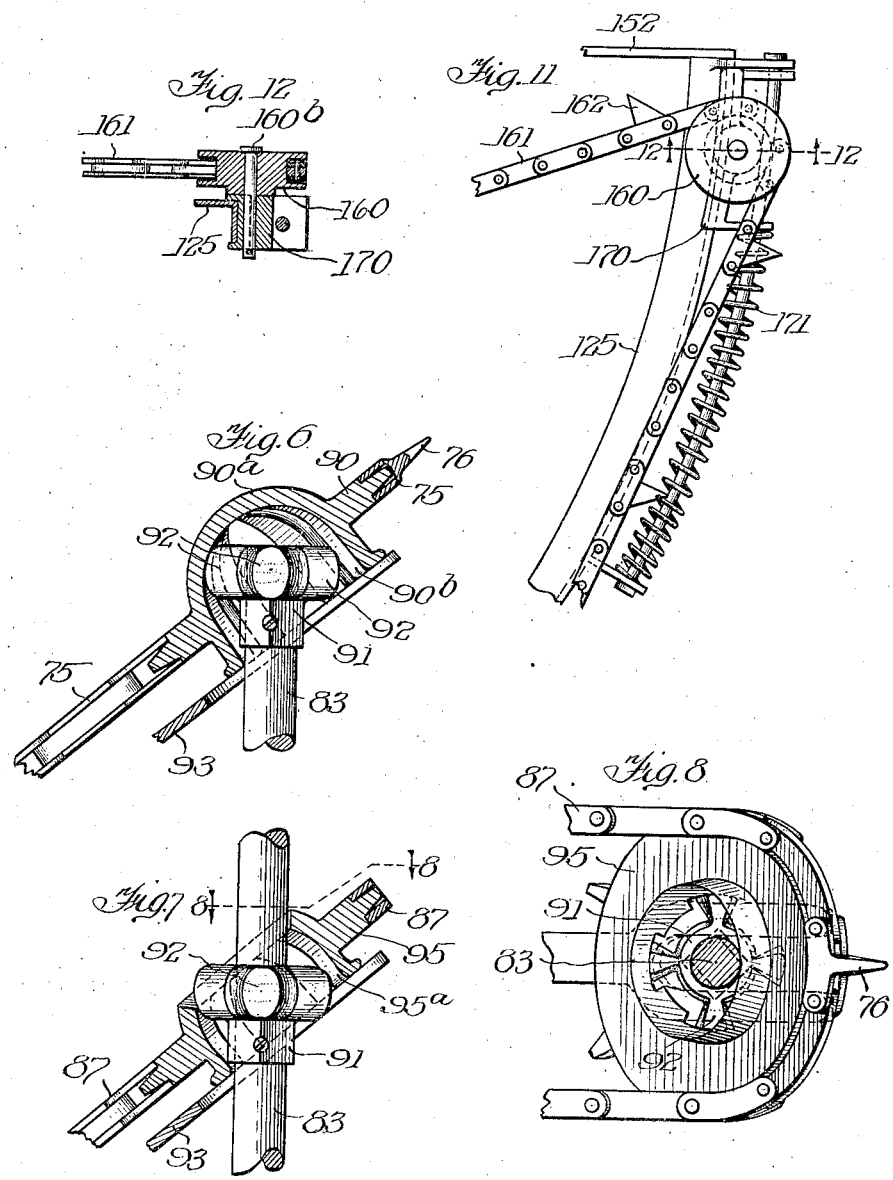

Apr. 24, 1923.
D. T. PHILLIPS
1,452,929
CORN HARVESTER AND SHOCKER
Filed March 15, 1919
6 Sheets-Sheet 6
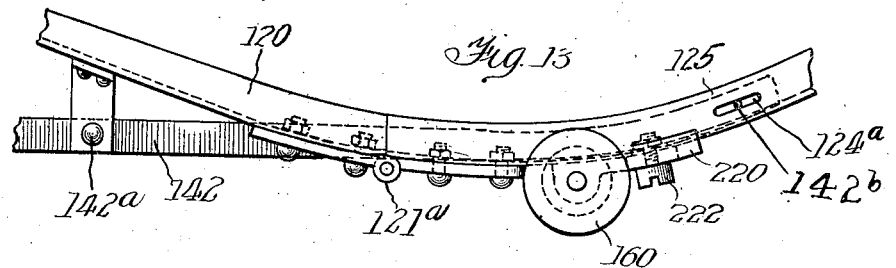
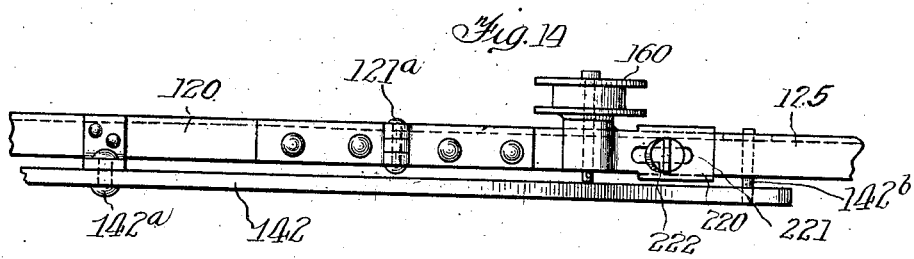
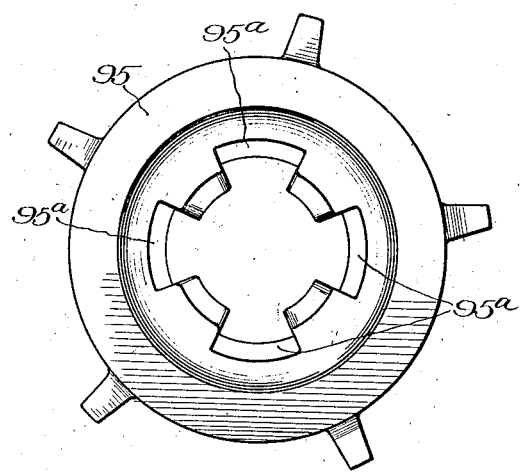
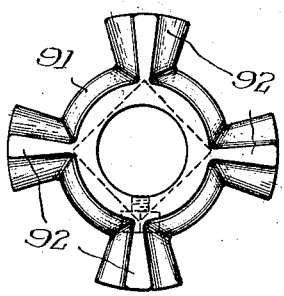

Patented Apr. 24, 1923.

1,452,929

UNITED STATES PATENT OFFICE.

DARIUS T. PHILLIPS, OF CHICAGO, ILLINOIS, ASSIGNOR OF ONE-HALF TO CHARLES G. WILLIAMS, OF CHICAGO, ILLINOIS.

CORN HARVESTER AND SHOCKER.

Application filed March 15, 1919. Serial No. 282,941.

*To all whom it may concern:*

Be it known that I, DARIUS T. PHILLIPS, a citizen of the United States, residing at Chicago, in the county of Cook and State of Illinois, have invented certain new and useful Improvements in Corn Harvesters and Shockers, of which the following is a specification.

The invention relates to machines for harvesting and shocking maize or Indian corn or other similar farm crops usually planted in rows, and it is the object of the invention to generally improve the construction of this class of machines, making the same more efficient in operation by increasing the capacity and at the same time improving the quality of the work of the machine and making it easier for the operator to tie and deliver the standing shock upon the ground.

More specifically stated, it is among the objects of the present invention to improve the mechanism used in forming and packing the corn or similar cut material into shocks and in the provision of improved means for discharging the shocks from the machine upon the ground in a standing position.

Among other features of novelty it is also an object of the present invention to provide improved means for driving the packing and conveying chains which are more direct, efficient and economical than devices heretofore employed for this purpose.

To attain these objects and others hereinafter pointed out the invention consists in the features of novelty hereinafter described, shown in the drawings forming a part of the specification, and more particularly pointed out in the subjoined claims.

In the drawings,

Fig. 1 is a plan view of the complete machine, portions of the draft mechanism only being broken away, or not shown.

Fig. 2 is a side elevation of the machine.

Fig. 3 is a sectional view of the machine, looking in the direction of the arrows on approximately line 3—3 of Fig. 2.

Fig. 4 is a view designed to show the details of the shock forming mechanism and is a partial section taken approximately on line 4—4 of Fig. 2.

Fig. 5 is a similar view, being a rear elevation of parts of the shocking device.

Fig. 6 is a detail sectional view of one of the chain driving sprockets and its actuating mechanism; and Fig. 7 is a similar view of another driving sprocket and the means for imparting movement to same.

Fig. 8 is a top plan view of the sprocket mechanism shown in Fig. 7, the driving shaft being in section, the view being taken approximately on line 8—8 of Fig. 7.

Figs. 9 and 10 are detail views of the driving sprocket and its actuating mechanism of the form shown in Figs. 7 and 8.

Fig. 11 is a broken detail view of a portion of the shock forming means; and

Fig. 12 is a section on the line 12—12 of Fig. 11, looking in the direction indicated by the arrows.

Figs. 13 and 14 are respectively plan and elevation views of details of the shock forming means.

Fig. 15 is a view of the supplemental conveyer and packing mechanism, and

Fig. 16 is a plan view of a detail of the same.

My improved corn harvesting and shocking machine is preferably mounted on a suitable frame, which is carried upon two relatively large driving wheels, which are designated by the reference characters 10 and 11. These driving wheels may be of the usual or any suitable construction and it is preferred that they be mounted in the frame of the machine upon the usual segments or racks so as to enable the frame to be raised and lowered on the wheels. In the embodiment illustrated in the drawings the main frame of the machine comprises a cross-bar 12, preferably of metal, being in the form of angle iron or other suitable construction. To the member 12 is secured suitable rectangular frames 13, 14, situated in approximately the same plane and extending rearwardly, being adapted to surround the driving wheels 10 and 11. One of these frames is shown in side elevation in Fig. 2, and a plan view of both appears in Fig. 1. To these frames 13, 14 are secured the segments before mentioned, one of which is shown in detail in Fig. 2, being indicated by the reference character 15. The driving wheels 10 and 11 are mounted on short axles as indicated at 16, Fig. 2, and the driving wheels are loosely mounted to turn on these axles. At the ends of the axle 16 there are the usual small gears or pinions, one of which is shown on the axle 16 in Fig. 2, the same being in mesh with the teeth on the rack or segment 15. Secured to the axle 16 is the usual worm gear 17, meshing with the worm 18 on the crank-rod 19, which is journaled on the machine frame. This construction in the usual manner allows the operator by manipulating the crank-rods 19 to raise and lower the axles 16 in the toothed segments 15, which results in raising and lowering the main frame when the driving wheels 10 and 11 are upon the ground.

Extending forwardly from the member 12 of the main frame is a stub tongue 20, which is rigidly secured to the main frame of the machine and forms a part thereof. This stub tongue 20 terminates at a short distance in front of the machine and just in advance of the forward extremities of the gathering arms, as will be seen in Figs. 1 and 2, and at its forward extremity it is provided with a bracket 21, swiveled thereto. This bracket 21 is forked and carries a wheel 22, preferably of smaller diameter than the main driving wheels, as shown in Fig. 2. This wheel 22 is in the form of a caster wheel, since the bracket 21 is swiveled to the stub tongue and consequently allows the machine to follow the movements imparted to the machine by the draft device 60, which latter is rigidly connected to the forward extremity of the stub tongue 20. The draft appliances will be hereinafter referred to and described.

Each of the main driving wheels 10, 11 are provided with driving sprockets 24, which are secured to turn therewith, and over these sprockets pass the driving chains 25, which cooperate with the small driven sprockets on driven shafts 26, 27, (Fig. 1), the latter being journaled to rotate in the machine frame. The driven sprockets just referred to are not shown in detail in the drawings, but are of the usual toothed form and are provided with hubs indicated by the reference characters 28, 29, and are mounted to rotate loosely upon the driven shafts 26, 27. Movement is imparted to the driven shafts 26, 27 from these driven sprockets by reason of the fact that the hubs 28, 29 are toothed at one end and cooperate with similar toothed portions on sliding members 30, 31, which latter are splined so that they are fixed to rotate with the driven shafts 26, 27, but are slidably carried thereon under the control of the shipper forks 32, 33. The branches of the shipper forks 32, 33 engage the toothed sliding members 30, 31 in suitably formed grooves in the usual manner and are pivoted to some part of the main frame as the bar 12, and are controlled by suitable means within reach of the driver in order that they may be shipped to throw the machine into and out of gear in the usual manner. The means shown for this purpose in Fig. 1 consists of the links 34, 35, pivotally connected at one end to the free ends of the shipper forks 32, 33, and at their other ends to the crank arms 36, 37, which are connected with rotatable rods provided with suitable means at their extremities near the driver's seat by which the shipper members 32, 33 may be actuated. Such hand members are indicated by the reference characters 38, 39, Fig. 1. 40 and 41 are bevel gears fixedly secured to the shafts 26, 27, and these mesh with small bevels on pitman crank shafts 42, 43, the cranks on the forward ends of which latter crank shafts operate the knife pitmen 44, 45, to which latter are connected suitable knives 46, 47, adapted to reciprocate over suitable spaced side knives 48, 49, located on opposite sides of a throat formed between the gathering arms adapted to be passed on each side of two adjacent standing rows of corn. The knife bars 46, 47 are shown supplied with one or more suitable knife sections of the usual form and not particularly designated, as the cutting mechanism forms no particular part of the present invention.

The gathering arms may be of the usual or any suitable construction, and in the present embodiment of the invention these are shown as made up of framework secured forwardly of the cross-bar 12 of the main frame. There are two pairs of these gathering arms, the arms of each pair being spaced apart in the usual manner to pass upon each side of a standing row of corn, as shown most clearly in Fig. 1. Since the gathering arms of each of the two pairs are similar in construction, reference to the details thereof will only be made in connection with that form of the gathering arms shown in side elevation in Fig. 2, from which it will be seen that there is a forwardly projecting member 50 formed of angle iron or other material of suitable form in cross-section, the same being secured at its rearward extremity to the main frame adjacent the cross-bar 12, and projecting thence downwardly for some distance and thence forwardly approximately parallel with the ground to a point just to the rear of the caster wheel 22. These forwardly extending members 50 of the divider arms have their forward projections slightly extended apart as indicated at 50ª. (Fig. 2) in order to pass more conveniently on each side of the row of corn and to assist in deflecting inwardly any stalks of corn which may be out of the usual or vertical position or located somewhat outside of the line of the row. The divider arms are completed by uprights secured near their rear ends to the main frame and extending vertically as shown in Fig. 2 and indicated by the reference character 51. Suitable divider boards 51ª formed of wood or metal in such a manner as to assist in properly guiding the stalks into the throat formed between the divider arms, are secured to the upper extremities of the vertical members 51 and extend forwardly and downwardly to a point just in the rear of the forward extremities 50ª of the lower frame members of the dividers. Each of the four divider arms is substantially of this construction, and in order to render them firm, suitable braces may be provided, as for example, the braces 52, 53, which extend diagonally from the cross-bar 12 of the machine main frame to the outside divider members 50. In order to suitably brace the inside divider members as well as the stub tongue 20, braces as indicated at 54, 55 may extend from the main frame to the stub tongue 20, where they are secured, and extend thence outwardly as indicated at 56, 57, to the inside lower divider members 50. The stub tongue 20 may be used to carry the driver's seat, which is indicated by the reference character 58, (Figs. 1 and 2).

Just beneath and in front of the cross member 12 of the main frame is preferably secured the draft evener. In the preferred form of my machine as illustrated in the drawings, three horses or other draft animals will be used in drawing the machine over the field. To accomplish this, just forward of the stub tongue 20 (see Figs. 1, 2, and 3) I connect a cross-bar 60, to the extremities of which are pivoted suitable shafts 61, 62, one of which is adapted to lie on either side of the center draft animal. For the purpose of guiding the machine the cross bar 60 may be rigidly connected with the bracket 21 supporting the caster wheel 22, so that the movement of the center draft animal laterally may be used to impart the same movement to the caster wheel 22 for use in guiding the machine. Immediately beneath the rear end of the stub tongue 20 to the main frame of the machine the draft evener may be secured, and this may consist of the bar 63 pivoted at 64 to the main frame or to the stub tongue and carrying at its outer extremities pivoted members 65, 66 in the form of levers fulcrumed at 67, 68, and having their shorter arms extending beyond the ends of the bar 63, to the extremities of which the two outer draft animals may be hitched in the usual manner by suitable chains or rods 66ª (Fig. 2) extending forwardly to a position which will place these outside animals side by side with the center draft animal. These rod or chain connections from the extremities of the draft device to the outside draft animals are not shown, except a broken portion in Fig. 2, since they may be of the usual or any desired form and comprise no part of the present invention. It will be noted that as shown for example in Fig. 3, the levers are so distributed that the center draft animal may counteract the pull of the outside animals since the longer arms of the levers 65, 66 extend inwardly from the pivotal connections 67, 68 and are connected to the inner extremities of draft rods 69 and 70 which extend forwardly to a point just forward of the caster wheel 22, where these rods are connected to a suitable keeper 71, and short chains 72 extend thence forwardly to a suitable single-tree, not here shown, to which the center draft animal within the shafts 61, 62 may be hitched. By thus employing three draft animals in the usual manner, it will be seen that each animal may walk between two standing rows of corn, the machine being adapted to cut two rows at a time.

To the rear of the cross-bar 12 of the main frame is located shock collecting, forming and tying devices, and I provide means carried by the main frame for supporting these devices, consisting of extensions of the main frame.

It has been common in machines of this class to provide a forming table upon which the cut corn is collected for the purpose of forming the shocks. It is among the important purposes of the present invention to dispense with a shock-forming table of the usual construction, thereby dispensing with the use of cumbersome and expensive derrick apparatus for lifting the shocks when formed and delivering the same upon the ground.

The divider arms heretofore referred to, direct the corn in the usual manner in this class of machines to the cutting apparatus, where the stalks of corn in each of the two rows is severed, but before being severed the stalks are embraced by the conveying apparatus, which consists of the usual inclined chains and carrying fingers. Any desired number of chains may be employed, but in the preferred form of the invention as shown, particularly in Figs. 1 and 2, two pairs of conveyer chains working on opposite sides of the throat formed between the divider arms, are employed. This consists first of the upper runs of the conveyer chains on each of the divider arms just beneath the top divider boards 51ª, and are all designated by the reference character 75, since each of these upper runs are similar in construction. Each chain is provided with a plurality of the usual carrying fingers 76, which fingers assist in gripping the stalks and guiding them to the knives, and after cutting, conveying them to the shock-forming mechanism. These four pairs of upper sprocket chains 75 are all driven from suitable sprocket wheels carried on four vertical upright shafts designated by the reference characters 80, 81, 82, 83, and are shown most clearly in Fig. 3. These shafts are journaled at their lower extremities in suitable brackets 84 on the main frame of the machine and are provided with suitable bevel gears 85, shown in Fig. 3, which mesh with driving gears 86 on the shafts 26 and 27. In addition to the upper guiding and conveying chains 75, there are four lower short supplementary chains 87 which extend from a point a little in advance of the cutting apparatus to a point just in advance of the shock-forming apparatus and these shorter conveying chains extend approximately parallel to the upper chains 75.

In order to furnish driving means for the pairs of sprocket chains 75 and 87 I provide a novel means in the form of driving sprocket wheels journaled on the vertical shafts 80 to 83 inclusive, so that these sprocket wheels may have universal movement thereon. In Fig. 6 is shown the details of one of the flexibly mounted upper driving sprockets, as for example, that shown mounted on the top of vertical shaft 83. The wheel proper is designated by the reference character 90, and while it is shown in section it is seen that it is provided with the usual sprocket teeth adapted to engage the chain 75. The wheels 90 are provided with a central housing somewhat enlarged and given the general contour of a hollow hemisphere, on the interior of which there are provided a number of grooves adapted to receive radially extending members on a cooperating member forming a universal or ball joint. The housing on this wheel is indicated by the reference character 90$^a$ and the grooves therein by the reference character 90$^b$, while the member secured to the upper extremity of the shaft 83 is designated by the reference character 91, the radially extending branches thereon being indicated at 92. This construction, it will be seen, permits a certain amount of universal movement between the shaft 83 and the sprocket wheel 90, and since a plate 93 on the divider frames or the machine main frame is provided against which the lower extremity of the hub part of wheel 90 is adapted to bear, the sprocket wheel 90 will rotate on an axis at an angle to the axis of the shaft 83, thus giving to the conveyer chains 75 the proper angle of movement. This construction it will be seen is very simple and economical and is at the same time found to be very efficient in practice. The chains 75 are supported at their lower and forward extremities by the usual idlers, which are not given any designating characters as they form no part of the present invention, and may be of the usual or any desired construction. The lower series of conveyer chains 87 on the divider arms are driven by a series of four sprocket wheels of similar construction, to sprockets 90, one of which is designated in Figs. 7 and 8, and is indicated by the reference character 95. This sprocket wheel 95 is of the same general construction as the sprocket wheel 90 except that the hub portion is open at its upper side to permit the passage therethrough of one of the driving shafts, as the shaft 83, but it is grooved in the same manner as the sprocket wheel 90, and cooperates with a member 91 provided with the radial branches 92 in the same manner as the wheel 90 shown in Fig. 6, being guided in a similar manner to retain the wheel in the same plane of movement as the sprocket wheels 90 by the plates 93 secured to the divider frames or the machine main frame. The enlarged hub portion of the sprocket wheels 95 is provided with grooves 95$^a$ similar to the grooves 90$^b$ on sprocket wheels 90, described. This construction of the sprocket wheels 95 enables them to operate in a manner similar to the described operation of the wheels 90, and renders it unnecessary to employ the usual complicated and expensive form of universal joints in the driving shafts 80 to 83 inclusive. Like the chains 75 the sprocket chains 87 are also carried at their forward extremities just forward of the cutting apparatus by suitable idlers, which may be of the usual or any desired construction, and are given no designating characters as they form no part of the present invention.

The corn is severed in the usual manner between the divider arms, and is conveyed by the conveyer chains to the rear of the divider arms and is there delivered to other conveying and packing chains, also driven from the four vertical shafts 80 to 83 inclusive. This conveying and packing means consists of a series of suitably arranged sprocket wheels and chains operated from said vertical shafts cooperating with shock-forming means carried by the machine main frame at the rear of the dividers and between and just to the rear of the main driving wheels 10 and 11, as will be seen by an inspection of Figs. 1 and 2, and the same will now be described in detail.

In Figs. 15 and 16 are shown the details of a supplemental conveying and packing mechanism, consisting of a simple framework indicated by upper and lower pivoted members 300 and 301. These members are preferably joined together by suitable connecting braces indicated at 302; and extending from the braces 302 to the main frame 12 is a brace 303. The members 300 and 301 are journaled on each of the inside upright driving shafts at the rear of the cutting apparatus, these shafts being designated by the reference characters 81 and 82. Both shafts 81 and 82 are provided with these extension frames similar to that illustrated in Fig. 15, and these frames are the means for supporting short supplemental packing chains provided with teeth as indicated at 304 and 305, Fig. 15. To the upper frame 300 is pivotally connected an arm or finger 306, the pivotal connection being indicated at 307 in the detail view Fig. 16. The arm or finger 306 preferably has freedom of movement within certain limits, there being a pin 308 provided on the frame 300 adapted to be engaged by a projection as indicated on the member 306 adjacent to the pivot. The frame as described carrying the supplemental packing chains 304, 305 may, if desired, be suitably connected to means near the driver's seat, thus enabling these supplemental packers to be thrown into or out of operation under the driver's control. In the form of construction, however, shown in the drawings these supplemental packing frames are shown connected to the main frame of the machine by means of the extension braces 303, one of which is shown in Fig. 15, extending forwardly and downwardly to the main frame 12. It will be apparent that these extension packing devices will assist in conveying the corn after it leaves the cutting and conveying apparatus and will insure its delivery into the shock-forming chamber. The pivoted arms 306 on either side will also occupy a position adjacent the main packing chains and will cause the corn to be held in contact with the chains, but being pivoted, as the size of the shock increases they may move out of the way of the incoming corn so as to prevent binding to a degree that would interfere with the operation of the packing chains.

To the rear of the cutting devices a suitable framework is provided for supporting the conveying and shock packing or forming means. Preferably above the cross sill 12 and the rear end of tongue 20 is erected the vertical support 100 (Figs. 3 and 4). From this support there are two sills spaced apart and extending rearwardly as shown in Fig. 4, the lower sill being indicated by the reference character 101 and the upper sill at 102.

It is desirable to form a shock of corn with a hollow core in order to give the shock stability, not only for discharging it from the machine but in subsequently standing in the field under weather conditions. To the sills 101 and 102, spaced apart as indicated in Fig. 4 and extending rearwardly from the delivery end of the gathering chains and midway between the delivery ends of the gathering chains are pivoted suitable curved guide rods or bars around which the shock is formed as a core. There is a pair of these curved rods journaled or pivotally secured to each of the sills 101, 102 and extending on each side thereof and being formed as shown in the plan view of Fig. 1 to form a complete circle. These upper curved rods are indicated by the reference characters 103, 104 and the lower corresponding pair of rods by the reference characters 105, 106. In order to give the shock its proper shape the lower pair of rods 105, 106 form a circle of considerably larger diameter than the upper pair 103, 104. If desired these curved rods or inward guides may be pivotally secured to the upper and lower sills 101, 102 directly by means of brackets, or the brackets may be extended from the sills as shown by the lower pair of brackets connecting the rods 105, 106 with the sill 101. The rods 103, 104 and 105, 106 are provided with suitable journal portions as shown in Fig. 1 to enable them to be pivotally secured to their supports and at their forward extremities they are preferably extended to the front side of the machine frame, as indicated in Fig. 3, where they are provided with crank arms 107, 108. These crank arms are pivotally connected at their outer extremities with links 109, 110 to a common crank arm 111, by which they are synchronously operated. The arm 111 is pivotally connected with the main cross frame 12, as shown in Fig. 3, and is adapted to be actuated by reason of its pivotal connection at 112 with a floating bar 113, which extends parallel with the frame member 12 from side to side of the machine and terminates adjacent the inside of each of the driving wheels. This floating bar 113 in addition to operating the pivoted lever 111 has another function in connection with the operation of the collapsible bottom which in part supports the shock while it is in the shock forming and packing means and the details of this latter construction will be presently described. Reciprocating motion is imparted to the floating member 113 by means of a lever 114 pivotally connected to a fixed part of the machine frame as to the bracket 115 secured to the tongue 20. The upper extremity of the lever 114 is formed with a suitable means for the hand of the operator and it extends within convenient reach of the operator from his seat, so that by shifting of this lever he may through the intervening links and levers described cause the curved pivotal supports 105, 106 to be actuated to the position shown for example in Fig. 3 and in Fig. 4, or he may by throwing the lever in the opposite direction cause these curved core bars to be collapsed downwardly in releasing and discharging the shock. The lower pair of curved core bars 105, 106 is connected to the upper and smaller pair 103, 104 by means of diagonally extending links 116, 117, so that when the operator by means of the lever 114 and intermediate connections actuates the core bars 105, 106, there is imparted a corresponding movement at the same time to the links 116, 117 and to the members 103, 104—in other words, causing both pairs of core bars to have a synchronous movement.

Surrounding the collapsible core bars just described and spaced apart therefrom so as to allow the accumulation of the corn for the purpose of forming a shock is a series of outer curved hinged numbers adapted when in their normal position to surround the outer periphery of the shock around the greater portion thereof. As in the case of the curved core bars described these outer curved hinged members are spaced apart and they serve not only as retainers but as guides for the cut incoming corn which forms the shock. The general shape of these members may best be seen from an inspection of the plan view of Fig. 1, from which it will be seen that at the rearward extremity of the divider arms and near the outside thereof the forward extremities of the lower and outer curved hinged member is secured. These retainers have the general form or contour of a horse shoe, particularly the lower one which has the larger periphery, and it is preferably made up of a plurality of sections of metal suitably formed of angle iron, which is the material illustrated in the drawings. 120 and 121 designate forward sections of the lower retainer, the forward ends of which are secured as stated at the rear outside ends of the dividers, forming a continuation as it were of the throat between the divider arms. These members 120 and 121 extend rearwardly preferably a little less than a quarter of the periphery of the horse shoe shaped retainer and are hingedly jointed, as indicated at 122 and 123 (see Fig. 1), with other curved hinged members 124, 125, which latter are curved to form a continuation of the circle and are adapted to meet at the rear of the machine, forming a band or closure around the core members before described and spaced apart therefrom. The upper curved hinged members are of a similar shape and similarly formed except that it is much less in diameter, so that the space intervening between it and the upper pair of curved core members 103, 104 will be about the same as the space between the lower curved hinged member and the lower pair of core bars 105, 106. This upper retaining members comprises a pair of rearwardly extending members 126, 127, to the rear extremities of which are hingedly connected at 128, 129 a pair of curved arms 130, 131, which are so divided that they meet at the rear of the median line of the machine just as the divided curved hinged members 124, 125 heretofore described. The forward sections 120, 121 of the lower retaining member may be fixedly secured to the main frame of the machine by the stays 134, 135. The rearward sections of both the upper and lower curved hinged members are hingedly connected to permit the discharge of the shock rearward from the shock forming chamber and the tightening or separation of the divided and hinged sections is accomplished as follows. The curved hinged members 124, 125 have portions extending a short distance forwardly of their hinged connections 122, 123 to form a sort of crank arm and these extensions are provided with pins 140 (see Fig. 2) for pivotally connecting them with the operating levers 141, 142, which latter are pivotally connected to the main frame at 143, 144. These levers extend forwardly just beyond the main frame cross bar 12, where they are operatively connected with the shiftable bar 113 heretofore described as being under the control of the operator through the hand lever 114. This connection for the bar 141 is made through the lever 145, which is pivotally connected near the center thereof to the main frame and has a pivotal connection at its other extremity with the bar 113. The pivoted lever 142 is connected with the shiftable bar 113, as illustrated in Fig. 3, by a bracket forming one end of the shiftable bar 113, which bracket has an elongated vertically extending slot near its upper end adapted to receive the reduced forward extremity of the lever 142. This bracket is designated by the reference numeral 146 (see Fig. 3). It is desirable that both pairs of outer curved hinged numbers 124, 125 and 130, 131 shall open and close synchronously and a convenient construction for accomplishing this is illustrated particularly in Figs. 1, 3, and 5, from which it will be seen that the upper and lower pairs of retainers are connected by the bars 150, 151 and by a second pair, 152, 153, the latter pair being situated so as to connect the rear extremities of the outer curved hinged members. This construction it will be seen provides a sort of an upright cradle for receiving the incoming corn and for packing it into a shock. The struts or supports 151, 153 and 150, 152 may be joined about midway their length by cables 155, 156 and it is preferred that these cables be formed in part at least of elastic material as springs 155ª so as to press upon the corn as it is being packed in the forming chamber with an elastic tension.

Both pairs of the outer curved hinged members 124, 125, and 130, 131 are provided with a plurality of idlers indicated by the reference character 160, the same being adapted to carry suitable sprocket chains, indicated by the reference character 161, these sprocket chains 161 being preferably provided with suitable teeth for engaging the corn, and in order that they may be effectively operated the forward runs of the chains are extended to and around the main upright driving shafts 80 and 83 inclusive and by which they are driven through suitable sprocket wheels secured to these shafts. In order that the chains may be effective they are like the chains heretofore described on the divider arms provided with packing teeth designated by the reference character 162. These teeth are preferably not as long as the teeth on the chains of the divider arms, so that they do not engage the incoming stalks of corn as violently but merely serve to pack it towards the rear of the accumulating or shocking chamber.

The operation of the mechanism connecting with the shock forming chamber may now be understood, as it will be seen that the corn upon being cut and delivered to the shock forming and packing chains 161 at the rearward extremity of the divider arms will be delivered into the open chamber in a vertical or standing position and into the V-shaped opening formed between the chains 161. The upper and lower pair of core forming bars 103, 104 and 105, 106 being in their extended position as shown in the drawings, will, however, contact with the corn and cause the chains to engage more firmly with the stalks and carry them around the periphery of these core forming members. It will be seen from the drawings, particularly the view in Fig. 1, that the shock forming and packing chains 161 intersect the peripheries of the curved core forming members, but in order to prevent any binding between these members and the chains, due to the incoming stalks, the idlers 160 which carry the chains at the rearmost extremities of the curved hinged members 124, 125 and 130, 131 are mounted on supporting members 170 that are shiftable in relation to these curved members and are held in their extended position by suitable coil springs indicated by the reference character 171. These springs may be held in position by rods or other suitable guides shown in the drawings particularly Fig. 11, but not designated by any particular reference characters. This spring mounting of the rearmost idlers 160 will permit slack in the feeding runs of the chains 161 as the shock is being formed around the curved core bars, and will prevent any binding or breakage of the parts. It will be seen that on account of this construction as the stalks of corn are fed into the packing chamber after leaving the throats of the dividers the action of the spring pressed chains will be to feed the corn around the curved core members and into the packing chamber formed between the outer curved hinged members and the inner core bars.

The throat or passageway formed between the divider arms back of each of the cutters 48, 49 is preferably closed by a suitable bottom plate and immediately in the rear of the frame or cross bar 12 I provide a series of hinged bottom plates shown best in Fig. 1. These plates are formed preferably of suitable sheet metal cut into a plurality of sections and secured along one of their longitudinal edges to suitable pivoted members which are designated by the reference character 180 in Fig. 1, the plates themselves being designated by the reference character 181. The purpose of the plates 181 is to provide a bottom support for the incoming stalks of corn to the rear of the throats 182, 183, and after the corn passes over the front bar 12 of the main frame. The bars 180 to which the plates 181 are secured are suitably journaled in the main frame member 12 or some part secured thereto, and in order that they may be actuated or tilted to get them out of the way of the delivery of the shock on the ground their forward extremities are secured to crank arms 190, which will result in the tilting of the plates 181 when the shiftable bar 113 is moved transversely of the machine by the operation of lever 114, see Fig. 3. The crank arms 190 are pivotally connected with the shiftable bar 113 heretofore described as under the control of the operator through the hand lever 114.

The operation of tying and delivering a shock may now be described, since it will be remembered that the machine being in motion the cut stalks will be delivered over the throats 182, 183 upon the hinged platform members 181 and thence engaged between the curved core bars and the packing chains 161. The hinged bottom plates 181 are not extended below the shock proper or beyond the point where the corn is engaged between the curved core bars and the packing chains since after the engagement of the stalks of corn between the chains and these bars it is found in practice that due to the pressure on them the stalks of corn will not slide downwardly and no bottom to the shock forming chamber is, therefore, necessary to my improved form of machine. When the operation of placing the stalks in the shock forming chamber between the outer retaining members and the inner curved core bars under the action of the packing chains 161 has proceeded to a point where the operator desires to tie and deliver the shock, this may be accomplished, first by stopping the machine and then placing a retaining band or tie around the shock in the usual or any desired manner. A convenient device for tying and compressing the shock previous to delivery is illustrated in Figs. 1, 2, and 3, from which it will be seen that upon the upper portion of the frame and preferably upon the upper side of the top sill 102 is pivotally secured at its lower end an arm 195, carrying a twine can 196. This twine can may contain a quantity of binder twine with an end protruding from the box in a convenient position to be grasped by the operator after the shock has been compressed and is ready for tying. On the upper extremity of the arm 195 is provided a small windlass with a crank arm 197, the windlass being provided with a suitable ratchet 198 and a spring pressed pawl 199 to prevent rotation in an opposite direction and to hold the shock under tension. Upon the winding drum of the windlass, which drum is indicated by the reference character 199, Fig. 3, is provided a permanent compression band or strip 200, one end of which is secured to the drum 199 of the windlass and the other end is fixed to a bracket 201, having a curved portion 202 at its upper extremity. By inspecting Fig. 3 it will be seen that there is a hole formed in the curved plate 202 and this hole is provided for passing the strand of the compressing band 200 from its loop around the shock to the binding drum 199 merely as a guide therefor. In the normal operation of the machine the arm 195 carrying the shock compressing device may be carried in its inoperative position as shown in full lines in Fig. 2. When it is desired to compress the shock previous to tying, the compressing loop or band 200 may be put around the shock first swinging the pivoted arm 195 in the manner indicated in dotted lines in Fig. 2, after which the operator by manipulating the compressing device through the crank arm 197 may put any desired degree of compression upon the shock and the ratchet mechanism will hold the compressing device in its adjusted position until the twine from the twine box 196 is placed around the shock and tied. After the tying operation the shock is ready for discharge and this is accomplished by the manipulation of the hand lever 114 through the operator from his seat. It will be seen that with the parts in the position shown in the drawings, for example, in Figs. 1 and 3, the machine is in position for receiving the cut corn into the shock forming chamber previous to the operation of tying the shock. After the shock has been tied the operator may, by shifting the hand lever 114 and the shiftable cross bar 113, which moves therewith, cause the pivotally mounted bottom plates 181 to be tilted to an angular or approximately vertical position, thus releasing the forward side of the shock by permitting the corn stalks of the shock supported by the plates to descend when the thin edges of these plates are thus presented to the bottoms of the shocks. At the same time and by the same movement of the lever 114 and the shifting of the member 113 the connecting links heretofore described will cause the collapsing of the curved core forming bars 103, 104 and 105, 106, which will allow the shock to settle upon the ground. The same movement of the shifting member 113 will by operating the pivoted levers 141, 142 cause the outside curved hinged members 124, 125 and 130, 131, all of which carry the packing chains, to be released and to open up to approximately the position indicated in dotted lines in Fig. 1. All of these operations will, of course, allow the shock to settle considerably downward and to contact with the ground or with the stubble at its lower extremity, and if it were not for the upper and lower sills 101, 102 and the pivoted core forming mechanism carried thereby, the shock would be in an entirely free position upon the ground. There is, however, some slight resistance on this account to the delivery of the shock, and in order to reduce this resistance to the smallest possible degree, I provide an improved device shown most clearly in Figs. 1, 2, and 4. shown most clearly in Figs. 1, 2, and 4. This device consists of a protective covering or box-like member adapted during the instant of delivery of the shock to telescope over and upon the upper sill 102. This trough-like or box-like member is considerably elongated, as indicated by the top plan view in Fig. 1, where the same is designated by the reference character 210. The sides of this trough-like member are designated in Figs. 2 and 4 by the reference characters 211, 212. From an inspection of the device as shown in Figs. 2 and 4, it will be shown that it is somewhat wider than the arms 103, 104 when in their folded or collapsed position. Normally, this trough-like member is designed to occupy approximately the position shown in Figs. 2 and 4, where it extends from approximately the upper side of the sill 102 to a point some distance above the same, and it is held in this lifted position by means of suitable bolts which are visible in Figs. 2 and 4, and are surrounded by coil springs 215. These springs 215 bear at one end against the underside of the top of the trough-like member 210 and at their lower extremities against the sill 102. The springs 215 are of sufficient strength only to hold the member 210 in the lifted position during the formation of the shock, and the member 210, it will be seen, will serve the purpose of causing the stalks of corn to be supported above the sill 102 and the collapsible arms 103, 104, so that the shock will be formed and tied in this position. The sides of the member 210, it will be seen, are comparatively smooth and will give very little or no resistance to the discharge of the shock. When the operator has tied the shock, and the core forming bars and the hinged platform leaves are collapsed, the shock will descend by gravity and will carry the trough-like member 210 downwardly by reason of its own weight against the action of the springs 215, and as the sides 211, 212 of this member telescope over the collapsible core bars 103, 104, any rough or projecting portions of these bars will be covered, and the shock will slide easily from the machine and be delivered in a secure standing position upon the ground. After the machine has been operated to deliver the shock, the driver will start the draught team or draught animals and the machine will move forwardly until the shock has been completely cleared, the curved plate 202 on the compressor preventing forward tilting, after which, by manipulating the hand lever 114 the operator will place the curved core members and the retaining and packing mechanism, as well as the hinged bottom plates, in the normally operative position, after which he will proceed to operate the machine to cut and prepare another quantity of corn in the shock-forming chamber ready for the operation of tying and delivering same into a completed shock.

In Fig. 5, and particularly in Figs. 13 and 14, details of the hinge connections between the outer curved retaining and compressing arms are shown in detail. In Figs. 13 and 14 details of the hinge construction of members 124 and 125 are shown. The actuating bar 142 is pivotally connected at $142^a$ with the fixed part 120 of the outer retaining and compressing members of the shock-forming cradle, and pivoted or hinged thereto at $121^a$ is the hinged portion 125. The rearmost extremity or member 142 is provided with a pin $142^b$, which extends upwardly into a slot $124^a$ of the pivoted arm 125. It will be seen that this makes an operative connection so that the swinging of the bar 142 on its pivot $142^a$ will impart movement to arm 125 by reason of the pin $142^b$ cooperating with slot $124^a$ in the arm 125, causing the said arm to be opened or closed under the control of the operator from the lever 114.

The idlers for carrying the chains on the shock-forming mechanism, with the exception of those at the extreme rear of the machine which have already been referred to, may be secured by any desired means to the arms which carry them. If it is desired to give these idlers slight adjustment, this may be accomplished by employing slotted brackets 220, slotted as indicated at 221 and having the adjustable retaining bolts or screws 222.

In order that the invention may be understood the details of the preferred embodiment have been specifically shown and described; but it is not desired to be limited to the exact details shown, as persons skilled in the art may resort to many modifications without departing from the purpose and spirit of the invention.

I claim:

1. In a corn harvester and shocker, the combination with cutting and gathering devices, of shock forming and packing devices comprising a collapsible core, and a frame surrounding the core and provided with a plurality of packing chains adapted to receive the incoming corn from the cutting and gathering devices.

2. In a corn harvester and shocker, the combination with cutting and gathering devices, of shock forming and packing devices comprising a collapsible core, and a frame surrounding the core consisting of a plurality of separable portions each being provided with positively actuated packing devices.

3. In a corn harvester and shocker, the combination with cutting and gathering devices, of shock forming and packing devices comprising a collapsible core and a frame surrounding the core and consisting of a plurality of curved movable portions each carrying an endless packing chain, the runs of the chains on the concave sides of the curved frame portions being adapted to intersect the periphery of the core, and means for positively actuating the endless packing chains.

4. In a corn harvester and shocker, the combination with cutting and gathering devices, of shock forming and packing devices comprising a collapsible core, a frame surrounding the core consisting of a plurality of movable portions each being provided with positively actuated packing devices, and means under the control of the driver for operating the said movable portions of the frame for discharging the shock.

5. In a corn harvester and shocker, the combination with cutting and gathering devices, of shock forming and packing devices comprising a collapsible core, a frame surrounding the core consisting of a plurality of movable portions each being provided with positively actuated packing devices, a harvester main frame to which the said movable portions of the frame are hingedly connected, and means on the harvester main frame under the control of the driver for actuating the said movable portions for the purpose of discharging the shock.

6. In a corn harvester and shocker, the combination with cutting and gathering devices, of shock forming and packing devices comprising a collapsible core, a platform between the said shock forming and packing devices for guiding the butts of the corn stalks comprising a plurality of separately hinged members, a frame surrounding the said collapsible core and provided with a plurality of packing chains adapted to convey the corn from the cutting and gathering devices to the shock forming and packing devices over the said platform, and means under the control of the driver operable from a single source for collapsing the core and operating said pivoted sections of the platform for the purpose of discharging the shock.

7. In a corn harvester and shocker, the combination with a harvester main frame, of cutting and gathering devices, a collapsible core adapted to serve as the center of a shock forming device and comprising a sill extending fore and aft of the machine near the central portion thereof and intersecting the shock core and supported by the main frame, a plurality of core bars in the form of segments of a circle being pivotally secured on opposite sides of said sill, packing chains extending from adjacent the cutting and gathering devices and intersecting the peripheries of the said core bars, a movable protective framework on the exterior of the said core bars and forming the outer boundaries of the shock forming chamber, means on the last said devices for operatively carrying the said packing chains, and means under the control of the driver for synchronously operating the core bars and the said outer protective frame to discharge the shock.

8. In a corn harvester and shocker, the combination with cutting and gathering devices, of shock forming and packing devices comprising a collapsible core, a frame surrounding the core consisting of a plurality of movable portions each being provided with positively actuated packing devices, a platform between the shock forming and packing devices and the cutting and gathering devices comprising a plurality of pivotally mounted sections, and means under the control of the driver for synchronously operating the pivoted platform sections and the collapsible core for discharging the shock from the machine.

9. In a corn harvester and shocker the combination with stalk cutting and conveying mechanism of a shock forming device comprising packing mechanism, a collapsible core, and a device movably secured in relation to the shock forming chamber on the harvester frame comprising a windlass and a flexible member carried thereby for compressing the shock for tying.

10. In a corn harvester and shocker the combination with stalk cutting and conveying mechanism of a shock forming device comprising packing mechanism, a collapsible core, and a device pivotally secured to the harvester frame so as to be movable in relation to the shock forming device, comprising a windlass and flexible member secured thereto for compressing the shock for tying.

11. In a corn harvester and hocker the combination with stalk cutting and conveying mechanism, of a shock forming device comprising packing mechanism, and a device comprising an arm pivotally secured to the harvester frame, a twine box and a windlass carried by the said pivoted arm, and a flexible member secured to the windlass for compressing the shock for tying.

12. In a corn harvester and shocker the combination with stalk cutting and conveying mechanism of shock forming devices comprising packing mechanism, a collapsible core adjacent the packing mechanism and in the path of the incoming corn, said core comprising an elongated vertical frame with collapsible core bars extending from each side thereof and a protective device for the said frame comprising an inverted trough-like member adapted to overlie the top of said frame and means for supporting said inverted trough-like member whereby it may serve as a shield for the frame and collapsed core bars when the weight of the shock falls thereupon at the moment of delivery of the shock.

13. In a corn shocker and harvester the combination with stalk cutting and conveying mechanism of a shock forming device comprising packing mechanism consisting of a pair of curved arms pivotally mounted on the harvester frame and under the control of the driver, each of said curved frames carrying toothed packing chains, and means for imparting movement to said packing chains by the running of the machine.

14. In a corn harvester and shocker the combination with stalk cutting and conveying mechanism of a shock forming device comprising packing mechanism, a collapsible core with which the said packing mechanism is adapted to co-operate, said packing mechanism comprising a pair of hinged curved frames adapted to meet at the rear of the shock forming chamber, and means for operating the said frames from the driver's seat.

15. In a corn harvester and shocker the combination with stalk cutting and conveying mechanism of a shock forming chamber formed at the rear of the cutting and conveying mechanism and comprising a frame work of the general form of a frustrum of a cone, the rear portion of the said frame being divided at the rear of the chamber and each section thereof hingedly connected with the machine frame, the said sections comprising curved members spaced apart, each provided with devices for carrying packing chains, there being cross-pieces connecting the said curved members and elastic flexible connections between the said cross pieces to assist in forming a cradle or closure for the said shock forming chamber.

16. In a corn shocker and harvester the combination with stalk cutting and conveying mechanism of a shock forming chamber comprising a collapsible core of the general form of a frustrum of a cone and a surrounding frame work of the same general form and spaced apart therefrom, the sides of the said surrounding frame work being divided at the rear of the chamber and each side hingedly connected at the sides of the chamber, idler wheels carried by the said hinged sides for operating the packing devices, the rearmost of the idler wheels on each of the said hinged frames being movably mounted on said frames, and elastic means for controlling said wheels whereby the packing chains carried thereby may be held in yieldable operative relation to the shock during the forming thereof.

17. In a corn shocker and harvester the combination with corn cutting and conveying mechanism of a shock forming device comprising a frame of generally conical form, the side walls of said frame being constructed in separable sections and hinged to the harvester frame, each of the said hinged sections carrying a plurality of guide wheels for packing chains, certain of said wheels being mounted under spring control for permitting a variable movement to the inside rung of the said packing chains during the process of forming the shock on the interior of the packing chamber.

18. In a corn shocker and harvester the combination with stalk cutting and conveying mechanism of a shock forming chamber comprising a collapsible conical core, a separable closure framework spaced apart from the said conical core and operable by the driver for the purpose of delivering the shock, packing chains carried by the said outer curved members of the shock forming chamber, and a bottom interposed between the bottom of the shock forming chamber and the said cutting devices and comprising a plurality of plates hingedly connected to the main frame of the machine, and means under the control of the driver for rocking all of the said plates in unison from their normally horizontal to an approximately vertical position in discharging the shock.

In testimony whereof I have signed my name to this specification on this 11th day of March A. D 1919.

DARIUS T. PHILLIPS.